(12) United States Patent
Felt et al.

(10) Patent No.: US 7,775,331 B1
(45) Date of Patent: Aug. 17, 2010

(54) BRAKE BOOSTER STIFFENING PLATE

(75) Inventors: James Michael Felt, Auburn, CA (US); Jeffrey Adelbert Soucek, Aliso Viejo, CA (US); Timothy Saul Lane, Aliso Viejo, CA (US)

(73) Assignee: Felt Racing, LLC, Irvine, CA (US)

( * ) Notice: Subject to any disclaimer, the term of this patent is extended or adjusted under 35 U.S.C. 154(b) by 0 days.

(21) Appl. No.: 12/419,157

(22) Filed: Apr. 6, 2009

(51) Int. Cl.
*B62L 1/00* (2006.01)
(52) U.S. Cl. .................................. 188/24.12; 188/24.21
(58) Field of Classification Search ... 188/24.12–24.22; 280/275, 276
See application file for complete search history.

(56) References Cited

U.S. PATENT DOCUMENTS 5,626,209 A * 5/1997 Viola ....................... 188/24.14
5,803,207 A * 9/1998 Nielsen .................... 188/24.12
6,308,806 B1 * 10/2001 Nielsen .................... 188/24.11
2007/0068744 A1 * 3/2007 Tsai ........................ 188/24.12

OTHER PUBLICATIONS

"So, You Like Odd Brakes, Eh?"; Website article; http://www.blackbirdsf.org/brake_obscura/mtb.html.
"Bicycle Brake Systems"; Wikipedia article; http://en.wikipedia.org/wiki/Bicycle_brake_systems.
"Brake Booster Plate Black"; Product on website; http://nycbikes.com/item.php.?item_id=325.

* cited by examiner

*Primary Examiner*—Christopher P Schwartz
(74) *Attorney, Agent, or Firm*—Stetina Brunda Garred & Brucker

(57) ABSTRACT

An aerodynamic brake booster stiffening plate is provided which attaches to pivot posts of a center pull brake system. The aerodynamic brake booster stiffening plate mitigates outward bending of the posts upon actuation of the brake to allow for faster brake response times. Additionally, a front surface of the aerodynamic stiffening plate may be aerodynamically shaped and blended with the fork or frame of the bicycle to encourage a laminar flow of air past the brake.

11 Claims, 4 Drawing Sheets

BRAKE BOOSTER STIFFENING PLATE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a competition brake assembly having an aerodynamic configuration and a brake booster for promoting less wind drag and quicker brake response time.

Numerous brake systems for bicycles exist. A common type of brake system for a road bicycle is a side pull brake system. The side pull brake system comprises left and right levers that pivot about a central post. First distal end portions of the levers have brake pads which are aligned to a rim of a bicycle wheel. Opposed second distal end portions of the levers are attached to a cable which may actuate the side pull brake system between a release position and a braking position. The pivot post, about which the levers rotate, is subjected to equal and opposing forces by the levers. As such, the post does not tend to bend to the left or right side of the bicycle upon actuation of the brake. The post is internally stabilized by the levers themselves. Unfortunately, the cables and levers are externally exposed which may unacceptably increase drag for competition racing purposes.

Another type of brake system is a center pull caliper brake. In this system, two pivot posts are attached to either side of the bicycle wheel. One lever is pivotably mounted to each of the posts. Each lever has a brake pad which collectively engage both sides of a rim of the bicycle wheel to stop or slow down the bicycle. Unfortunately, since only one lever is attached to one post, upon braking, each of the two levers pushes the posts toward opposed directions. The levers tend to bend the posts and misalign the brake pads during the crucial action of braking. The brake pads may become misaligned to the rim of the bicycle wheel and cause other deficiencies in the braking system.

Accordingly, there is a need in the art for an improved center pull brake system that stabilizes the pivot post of the levers and simultaneously encourages reduced drag.

BRIEF SUMMARY

The brake system disclosed herein addresses the deficiencies discussed above, discussed below and those that are known in the art.

The brake system may be a center pull brake caliper, a linear-pull brake mechanism or any type of bicycle braking mechanism in which two posts are attached to a frame or a fork of the bicycle on opposed sides of the bicycle wheel. First distal end portion of the posts are attached to the bicycle frame or fork. Each of the posts has a lever rotatably mounted thereto. Brake pads are mounted to first distal end portions of the levers. Also, the brake pads are aligned to a rim of the wheel. Cables or other actuating mechanisms are attached to opposed second distal end portions of the levers. An aerodynamically shaped brake booster stiffening plate may be attached to second distal end portions of the posts.

Upon actuation of the brake system, the levers act upon the posts. Fortunately, the posts are stabilized with the frame or fork itself and the stiffening plate. In particular, first distal end portions of the posts are attached to the frame or fork. Also, the opposed second distal end portions of the posts are attached to the stiffening plate. The stiffening plate stabilizes the bending moment on the posts due to actuation of the brake levers.

Additionally, a front surface of the brake booster stiffening plate may have an aerodynamic shape. A rear edge of the brake booster stiffening plate may be blended with the exterior surface of the fork or bicycle frame.

This configuration provides for both a quicker brake response time and promotes less wind drag.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The brake assembly 10 discussed herein is for a competition racing bicycle in which minute improvements of drag are considered significant over a long period of time and at peak performance levels. Additionally, execution of braking should be crisp and sensitive to provide the racer or cyclist predictable and reliable braking operation. Although the brake system 10 is most beneficial in relation to a competition racing bicycle, it is also contemplated that the brake system 10 may be employed in a recreational bicycle.

Figure 1:
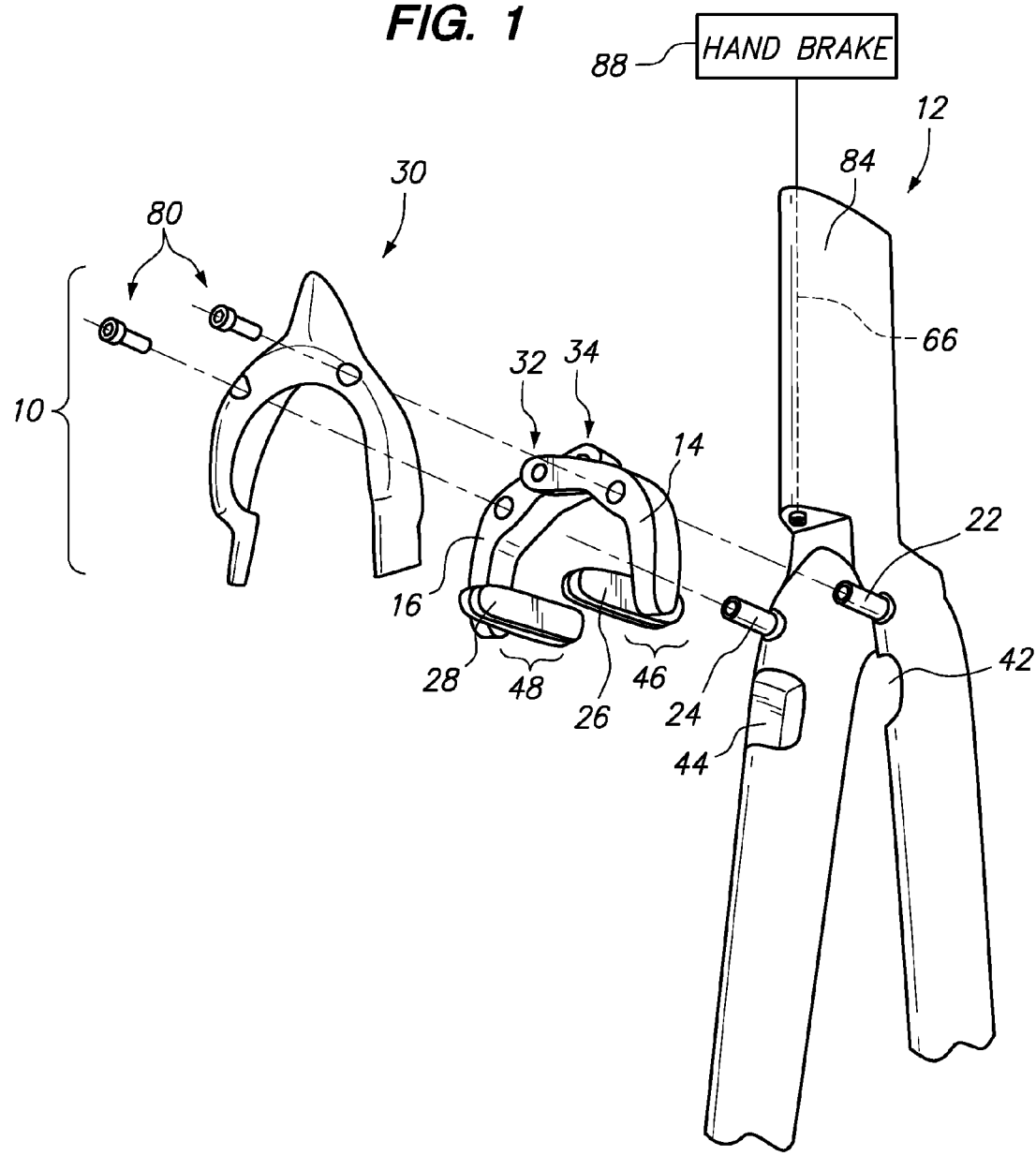
FIG. 1 is an exploded perspective view of a front brake assembly and fork.

Referring now to FIG. 1, an exploded perspective view of a front brake assembly 10 is shown. The front brake assembly 10 is mounted to a front fork 12 of a bicycle. When the front brake assembly 10 is actuated to slow down the bicycle, left and right brake levers 14, 16 pivot and apply a braking force to a rim 18 (see FIG. 3) of a wheel 20. In order to apply the braking force to the rim 18, left and right brake pads 26, 28 apply inwardly directed forces to the rim 18 of the wheel 20. The brake levers 14, 16 apply outwardly directed forces to the posts 22, 24. As shown in FIG. 2A, first distal end portions 19, 21 of the posts 22, 24 are fixed to the fork 12 (i.e., left and right blades 38, 40). To further stabilize the posts 22, 24, an aerodynamic stiffening plate 30 is attached to opposed second distal end portions 32, 34 of the left and right posts 22, 24 to mitigate outward bending of the posts 22, 24 upon actuation of the front brake 10 and reduce wind drag. The brake booster stiffening plate 30 maintains a space between the posts 22, 24 on one side of the posts 22, 24. The attachment of the posts 22, 24 to the fork 12 maintains a space between the post 24 on the other side. The posts 22, 24 are stabilized on both sides by (1) the fork 12 (or frame) and (2) the brake booster stiffening plate 30. Less bending of the posts 22, 24 provides a quicker brake response. Also, the stiffening plate and the brake assembly incorporate aerodynamic features promoting reduced wind drag.

Figure 2:
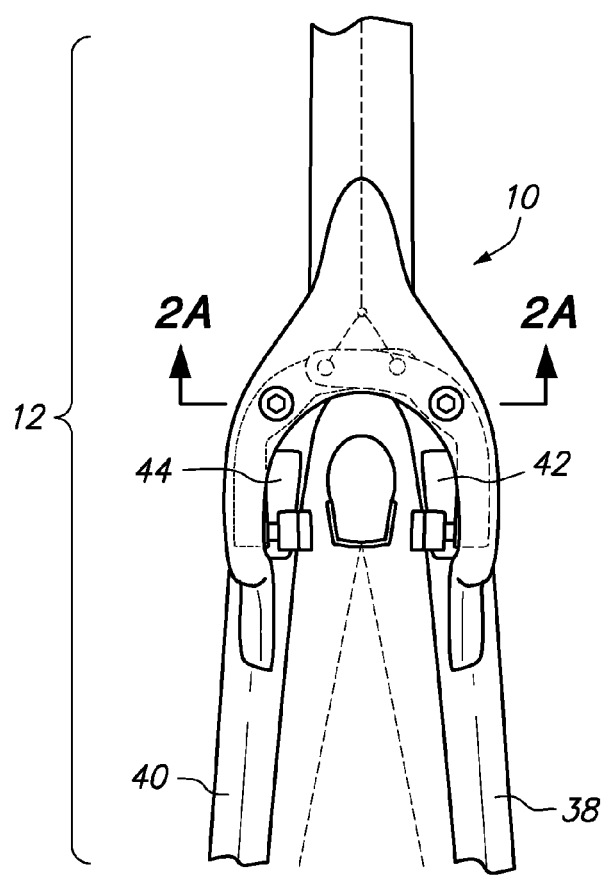
FIG. 2 is a front view of the front brake assembly with the front brake assembly in a released position.
Figure 2A:
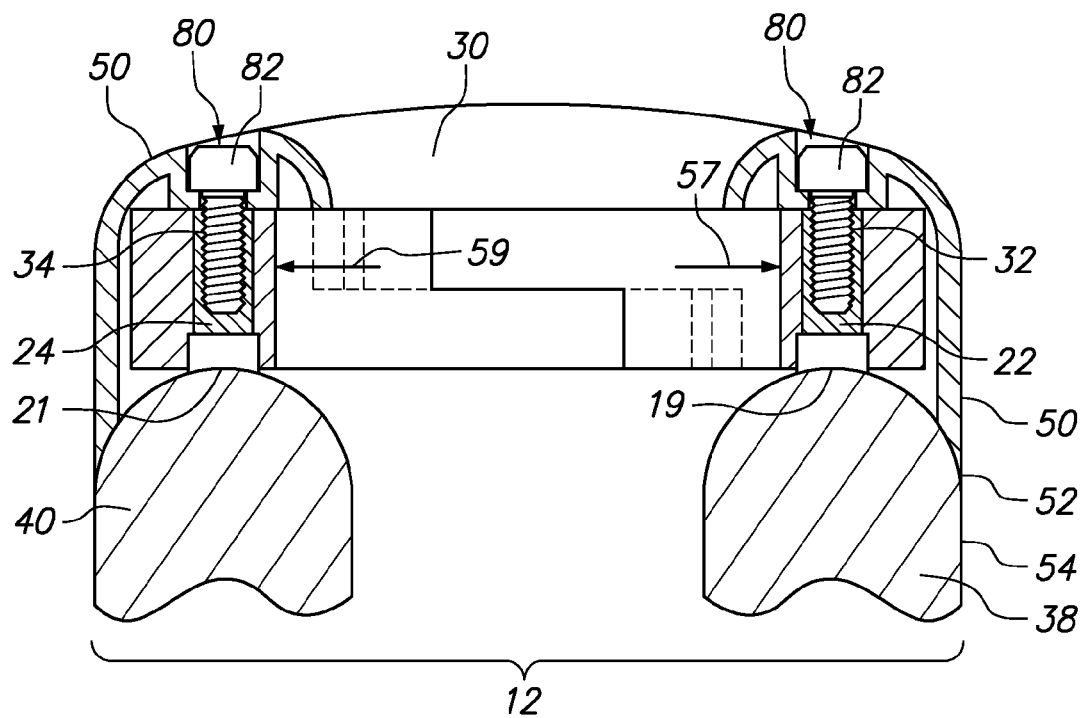
FIG. 2A is a cross sectional view of the front brake assembly shown in FIG. 2.

Referring now to FIG. 2, the front brake assembly 10 may have a reduced profile in that a portion of the brake assembly 10 is recessed into blades 38, 40 of the fork 12. The left and right blades 38, 40 may have left and right recesses 42, 44 (see FIGS. 1 and 2) within which a portion of the brake 10 resides when the front brake assembly 10 is in the released position (see FIG. 2). More particularly, as shown in FIG. 1, the left and right recesses 42, 44 may extend from a front side of the blades 38, 40 and extend rearwardly. Although the left and right recesses 42, 44 are not shown as extending through to the rear side of the blades 38, 40, it is contemplated that the left and right recesses 42, 44 may extend through to the rear side of the blades 38, 40. When the left and right levers 14, 16 are mounted to the left and right posts 22, 24, rear portions 46, 48 (see FIG. 1) of the left and right brake pads 26, 28 reside at least partially in the left and right recesses 42, 44 (see FIG. 2). Thus, a minimal amount of the brake pads 26, 28 interferes with the flow of air 56 (see FIG. 4) when the cyclist is attempting to increase speed or maintain top speed. The small frontal profile of the brake assembly 10 promotes a reduction of drag coefficient in a small but significant amount over a long period of time especially for competition racing purposes.

Figure 3:
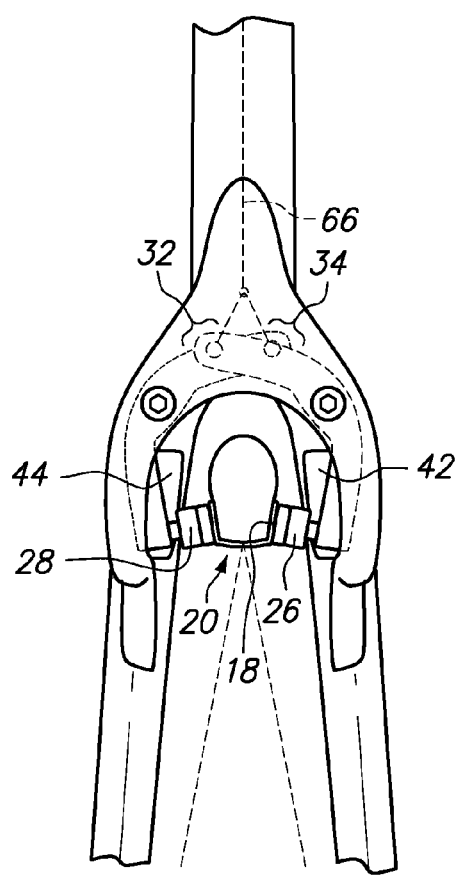
FIG. 3 is a front view of the front brake assembly with the front brake assembly in an engaged position.

Referring now to FIG. 3, when the cyclist is slowing down, the cyclist may actuate the front brake 10. At this time, the brake pads 26, 28 are at least partially traversed out of the recesses 42, 44 such that the brake pads 26, 28 may apply a frictional force to the rim 18 of the wheel 20. At this time, the cyclist is not concerned with the reduction of drag but is concerned with slowing the bicycle down or stopping. As such, the increased coefficient of drag due to the brake pads 26, 28 being traversed at least partially out of the recesses 42, 44 is not a concern.

Figure 4:
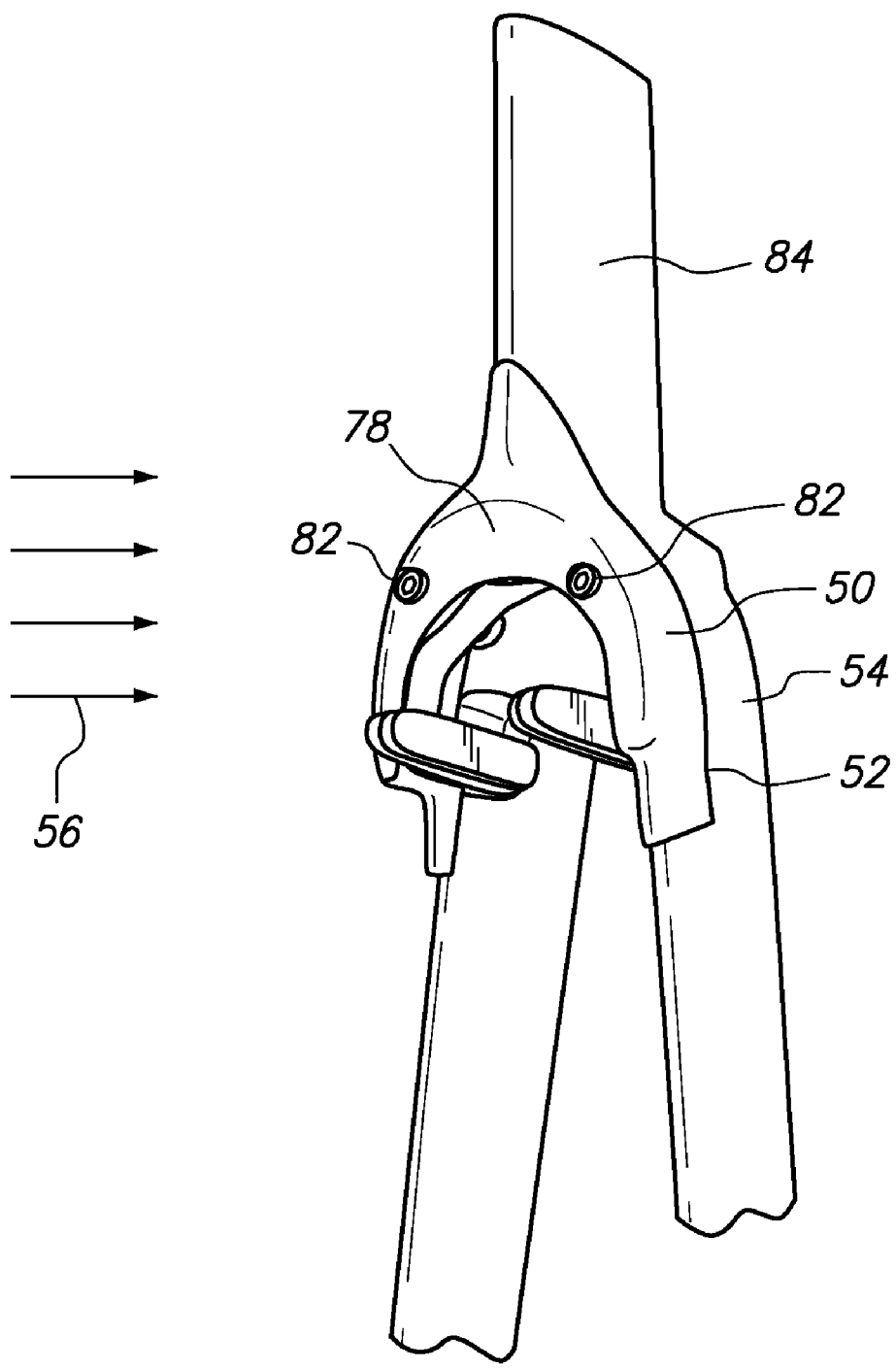
FIG. 4 is an assembled perspective view of the front brake assembly and front fork.

As shown in FIG. 1, the aerodynamic brake booster stiffening plate 30 is attached to the left and right posts 22, 24. This is also shown in FIG. 2A. The brake booster stiffening plate 30 may have an aerodynamic shape (see FIGS. 1 and 4) in that it has a generally smooth rounded contour to promote laminar flow of air. Also, the aerodynamic brake booster stiffening plate 30 may cover a majority of the left and right brake levers 14, 16 and brake pads 26, 28 of the front brake 10 when the front brake 10 is in the released position (see FIG. 2). As shown in FIGS. 2A and 4, the aerodynamic front surface 50 of the aerodynamic brake booster stiffening plate 30 may have a smooth round surface to promote laminar flow of air 56 as air 56 passes by the front brake assembly 10. More particularly, the aerodynamic brake booster stiffening plate 30 may have a generally inverted U-shaped configuration, as shown in FIGS. 1, 2 and 3. A rear edge 52 of the aerodynamic brake booster stiffening plate 30 may be blended with the exterior surface 54 of the front fork 12, as shown in FIG. 2A. In this manner, as air 56 flows past the front brake assembly 10, (1) the aerodynamic shape of the aerodynamic brake booster stiffening plate 30 and (2) the smooth transition from the aerodynamic stiffening plate 30 to the front fork 12 promote laminar flow of the air flow 56 so as to reduce drag.

Referring now to FIG. 3, when the front brake 10 is actuated, the brake pads 26, 28 apply an inwardly directed force against the rim 18 of the wheel 20. The rim 18 produces an opposing force in an outward direction against the brake pads 26, 28. Outwardly directed forces are also applied to the upper distal end portions 32, 34 of the brake levers 14, 16 by a cable assembly 66. The posts 22, 24 are urged outwardly by (1) the outwardly directed forces applied to the upper distal end portion 32, 34 of the brake levers 14, 16 by the cable assembly 66 and (2) the outwardly directed forces 57, 59 applied to the brake pads 26, 28. There is a net outward force 57, 59 (see FIG. 2A) applied to the posts 22, 24. FIG. 2A is a cross sectional view of the front fork 12 and front brake assembly 10 shown in FIG. 2. To counteract these forces, the first distal end portions 19, 21 of the left and right posts 22, 24 are attached to the left and right blades 38, 40 of the front fork. Also, opposed second distal end portions 32, 34 of the left and right posts 22, 24 are secured to the aerodynamic brake booster stiffening plate 30. As such, the fork 12 and the aerodynamic brake booster stiffening plate 30 stabilizes both sides of the posts 22, 24. The left and right posts 22, 24 do not bend outwardly or experience minimal outward bending upon actuation of the front brake 10. The aerodynamic brake booster stiffening plate 30 maintains alignment of the posts 22, 24. Also, since the posts 22, 24 do not deflect outwardly or has minimal outward bending upon braking, the brake has a faster response time and is able to produce more braking force with a given amount of hand braking pressure applied by the cyclist.

Referring now to FIG. 4, the exterior surface 76 of the aerodynamic brake booster stiffening plate 30 may have a convex leading edge 78. The convex leading edge 78 preferably has a smooth round configuration. The exterior surface 50 of the aerodynamic stiffening plate 30 extends to the exterior surface 54 of the front fork 12, as shown in FIG. 2A. Preferably, there is a smooth transition from the exterior surface 50 of the aerodynamic brake booster stiffening plate 30 to the exterior surface 54 of the front fork 12. The exterior surface 50 of the aerodynamic stiffening plate 30 may be blended with the exterior surface 54 of the front fork 12. The aerodynamic brake booster stiffening plate 30 may be attached to the left and right posts 22, 24 via two bolts 80. (see FIG. 2A). Preferably, the aerodynamic brake booster stiffening plate 30 has an aperture with a recess sized and configured to house a head 82 of the bolts 80. Preferably, the head 82 has a hex recess for tightening or loosening the bolts 80. Also, preferably, the head 82 is generally flush with the exterior surface 50 of the aerodynamic brake booster stiffening plate 30 to promote laminar flow of air 56 past the front brake assembly 10.

The front brake 10 may be a center pull type braking mechanism, as is commonly known in the art. Alternatively, the front brake 10 may be a linear-pull brake system, or any brake system in which two posts are attached to a frame of a bicycle or a fork of a bicycle on opposed sides of the bicycle wheel. The front fork 12 may have a fork head 84 such as the one described in U.S. patent application Ser. No. 11/595,205, filed on Nov. 10, 2006, the entire contents of which is expressly incorporated herein by reference. The center cable 66 may be attached to the distal end portions 32, 34 of the levers 14, 16. Moreover, the center cable 66 may be routed upward through the fork head 84 to the hand brake 88 (see FIG. 1).

It is also contemplated that the aerodynamic brake booster stiffening plate 30 may be implemented on a rear brake system of the bicycle. By way of example and not limitation, the rear brakes of the bicycle may be a center pull brake system. Left and right posts may be attached to left and right seat stays. The center pull brake system may be attached to the left and right posts as normal. Additionally, an aerodynamic brake booster stiffening plate 30 may be attached to the free distal end portions of the left and right posts to stabilize the forces acting upon the left and right posts by the brake levers. The exterior surface of the aerodynamic brake booster stiffening plate 30 may have an aerodynamic shape. Additionally, the rear edge may blend with the bicycle frame, for example, the left and right seat stays. It is also contemplated that the rear brake system may be disposed at other locations on the frame of the bicycle. By way of example and not limitation, the rear brake system may be located on the chain stays. In this embodiment, the rear brake system may be a center pull brake system with an aerodynamic brake booster stiffening plate 30 attached to free distal end portions of the posts 22, 24. The exterior surface of the aerodynamic brake booster stiffening plate 30 may have an aerodynamic shape. Also, the rear edge of the aerodynamic brake booster stiffening plate 30 may blend in with the bicycle frame, for example, the chain stays.

During a competition race, every cyclist is attempting to increase speed or to maintain a high speed of forward travel. To this end, the front brake assembly 10 reduces the drag coefficient of the overall bicycle. The front brake assembly 10 has an aerodynamically shaped stiffening plate 30. The aerodynamically shaped stiffening plate 30 covers the majority of the brake levers 14, 16, as shown in FIG. 2. The front surface 50 of the stiffening plate 30 may have a smooth round configuration to promote laminar flow of air past the front brake assembly 10. Additionally, the rear edge 52 of the aerodynamically shaped stiffening plate 30 may be blended (see FIG. 2A) with the exterior surface 54 of the front fork. From the front side to the rear side of the aerodynamically shaped stiffening plate 30, laminar flow of air past the front brake assembly 10 is encouraged.

Moreover, the front brake assembly 10 may have a small frontal profile, as shown in FIG. 2. Left and right rear portions 46, 48 of the left and right brake pads 26, 28 may at least be partially, if not entirely, disposed within recesses 42, 44 formed in medial sides of left and right fork blades 38, 40. During a race, as the cyclist increases speed or maintains a high rate of speed, the front brake assembly 10 is in the released position (see FIG. 2). The front brake pads 26, 28 remain generally out of the path of air travel. The front brake assembly 10 additionally has a lower profile which is illustrated in FIG. 2A. If the rear portions 46, 48 of the left and right brake pads 26, 28 are not disposed within the recesses 42, 44 of the left and right blades 38, 40, then the left and right brake pads 26, 28 must be pushed forward in front of the left and right blades 38, 40 of the front fork 12. The posts 22, 24 must be longer which create additional stresses on the stiffening plate 30 and may promote bending of the posts 22, 24.

To actuate the front brake assembly 10 from the released position to the engaged position (see FIG. 3), the cyclist applies pressure to a hand brake 88 (see FIG. 1), the hand brake 88 pulls the center cable 66 (see FIG. 1) which is connected to the distal end portions 32, 34 of the left and right brake levers 14, 16. The cables 86 will stretch introducing play within the brake system. Although a cable system is used to discuss the various aspects of the front brake assembly 10, it is also contemplated that a hydraulic brake system may also be implemented. As the cyclist continues to apply pressure to the hand brake 88, the left and right brake levers 14, 16 are pivoted until the left and right brake pads 26, 28 contact the rim 18 of the wheel 20. As the user continues to increase pressure on the hand brake 88, the brake pads 26, 28 apply an increasing brake pressure on the rim 18 of the wheel 20. During this time, forces are transmitted to the hand brake 88 to the center cable 86, to the left and right brake levers 14, 16 and the left and right brake pads 26, 28. The left and right levers 14, 16 are stabilized by the left and right posts 22, 24.

Without the aerodynamic stiffening plate 30, the brake levers 14, 16 apply an outward force to the posts 22, 24. Since the posts 22, 24 would be attached to only the blades 38, 40 of the front fork 12, the brake levers 14, 16 would tend to bend the posts 22, 24 outwardly. This outward bending of the posts 22, 24 would add additional tolerances or play within the brake system. This would require the cyclist to depress the hand brake 88 further before the left and right brake pads 26, 28 apply a sufficient amount of braking force to the wheel 20. Fortunately, when the aerodynamic stiffening plate 30 is secured to the second distal end portions 32, 34 of the left and right posts 22, 24, the aerodynamic stiffening plate 30 mitigates outward bending of the posts 22, 24 during actuation of the brake. As such, the cyclist can depress the hand brake 88 to a lesser degree before sufficient braking pressure is applied to the wheel 20. The brake system provides for a quicker response time upon depression of the hand brake 88 by the cyclist to effectuate braking.

The amount of outward bending of the posts 22, 24 is also mitigated by shortening the length of the posts 22, 24. At least a portion of the left and right brake pads is disposed within recesses 42, 44 of the blades 38, 40. This allows the posts to be shorter since the posts 22, 24 do not have to be long enough to allow the left and right brake pads 26, 28 to function in front of the left and right blades 38, 40 of the fork 12. Since the rear portions 46, 48 of the left and right brake pads 26, 28 are disposed within the recesses 42, 44, the brake levers 14, 16 may be attached closer to the left and right blades 38, 40 (see FIG. 2A), shorter posts 22, 24 may be implemented. Shorter posts 22, 24 create less outward bending by forces 57, 59. The reason is that torque is defined as force×distance. By reducing the distance, height or length of the posts 22, 24, the maximum amount of torque provided by force 57, 59 is also reduced proportionately to the length of the posts 22, 24. Hence, the configuration of the front brake assembly 10 provides for a compact, aerodynamic, highly responsive brake assembly.

The fork 12 and the aerodynamic brake booster stiffening plate 30 may be fabricated from carbon fiber, aluminum, or other materials known in the bicycle art or developed in the future.

The above description is given by way of example, and not limitation. Given the above disclosure, one skilled in the art could devise variations that are within the scope and spirit of the invention disclosed herein, including various ways of actuating the brake levers. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A front braking system of a competition bicycle comprising:
   a fork for mounting a bicycle wheel;
   first and second pivot posts attached to the fork, extended in a forward direction and disposed on opposed sides of the bicycle wheel;
   a first brake lever pivotably attached to the first pivot post wherein a first brake pad disposed at a distal portion of the first brake lever is frictionally engageable to a rim of the wheel on a first side of the bicycle wheel;
   a second brake lever pivotably attached to the second pivot post wherein a second brake pad disposed at a distal portion of the second brake lever is frictionally engageable to the rim of the wheel on a second side of the bicycle wheel to provide an equal and opposing force compared to the brake pad of the first brake lever on the rim of the wheel;
   means for traversing the first and second brake levers from a released position to an engaged position wherein the brake pads of the first and second brake levers are engaged to the rim of the wheel when the first and second brake levers are traversed to the engaged position; and an aerodynamic stiffening plate removably attached to free distal end portions of the first and second pivot posts to mitigate bending of the first and second pivots posts via the first and second brake levers when the means for traversing the first and second brake levers traverses the first and second brake levers to the engaged position and to promote reduced wind drag.

2. The system of claim 1 wherein the first and second brake levers are attached to first and second blades of the fork.

3. The system of claim 1 wherein the stiffening plate has first and second apertures, and the first and second posts snugly fits within the first and second apertures, respectively.

4. The system of claim 3 wherein first and second fasteners are threaded into internal threads of the first and second posts for securing the stiffening plate to the first and second pivot posts.

5. The system of claim 1 wherein a front surface of the stiffening plate has an aerodynamic shape to promote laminar flow of air past the front braking system.

6. The system of claim 1 wherein interior sides of blades of the fork has recesses in which the first and second brake levers reside when traversed to a released position to promote laminar flow of air past the front braking system.

7. The system of claim 1 wherein the means for traversing the first and second brake levers is a cable assembly.

8. The system of claim 1 wherein the means for traversing the first and second brake levers is a hydraulic system.

9. The system of claim 1 wherein a rear edge of the aerodynamic stiffening plate blends into an exterior surface of the fork.

10. The system of claim 1 wherein the first and second brake levers are disposed in front of the fork.

11. The system of claim 1 wherein the first and second pivot posts are disposed in front of the fork.

* * * * *